(12) United States Patent
Hodges

(10) Patent No.: US 10,919,504 B2
(45) Date of Patent: Feb. 16, 2021

(54) TRIP COCK VALVE FOR A BRAKE SYSTEM ON A RAIL CAR

(71) Applicant: Graham-White Manufacturing Company, Salem, VA (US)

(72) Inventor: Kenneth Hodges, Salem, VA (US)

(*) Notice: Subject to any disclaimer, the term of this patent is extended or adjusted under 35 U.S.C. 154(b) by 208 days.

(21) Appl. No.: 16/158,838

(22) Filed: Oct. 12, 2018

(65) Prior Publication Data

US 2020/0114895 A1    Apr. 16, 2020

(51) Int. Cl.
| | | |
|---|---|---|
| *B60T 7/12* | (2006.01) | |
| *B61G 5/08* | (2006.01) | |
| *B60T 15/18* | (2006.01) | |
| *B61H 13/00* | (2006.01) | |
| *F16K 37/00* | (2006.01) | |
| *B60T 15/42* | (2006.01) | |
| *F16K 17/36* | (2006.01) | |
| *B61H 1/00* | (2006.01) | |

(52) U.S. Cl.
CPC ............ *B60T 7/124* (2013.01); *B60T 15/184* (2013.01); *B60T 15/42* (2013.01); *B61G 5/08* (2013.01); *B61H 1/00* (2013.01); *B61H 13/00* (2013.01); *F16K 17/363* (2013.01); *F16K 17/366* (2013.01); *F16K 37/005* (2013.01); *F16K 37/0066* (2013.01); *Y10T 137/0753* (2015.04); *Y10T 137/0874* (2015.04); *Y10T 137/0923* (2015.04); *Y10T 137/8326* (2015.04)

(58) Field of Classification Search
CPC ........ B60T 15/184; B60T 15/42; B60T 7/124; B61H 1/00; B61H 13/00; F16K 37/0066; F16K 37/005; F16K 17/363; F16K 17/366; B61L 3/04; Y10T 137/8326; Y10T 137/0874; Y10T 137/0753; Y10T 137/0923

See application file for complete search history.

(56) References Cited

U.S. PATENT DOCUMENTS

| | | | | |
|---|---|---|---|---|
| 1,647,959 A | * | 11/1927 | Cousins | .................... B61L 3/04 246/171 |
| 2,055,122 A | | 9/1936 | Farmer | |
| 3,889,905 A | * | 6/1975 | Hall, Jr. | .................... B60T 7/12 246/170 |
| 3,992,062 A | * | 11/1976 | Jeffrey | .................. B60T 13/665 303/3 |
| 4,404,987 A | | 9/1983 | Bridigum et al. | |
| 6,142,167 A | * | 11/2000 | Pettesch | .................. F16K 17/36 137/39 |
| 8,967,591 B2 | | 3/2015 | Scharpf | |

FOREIGN PATENT DOCUMENTS

CN    105548508 A  *  5/2016

* cited by examiner

*Primary Examiner* — Atif H Chaudry
(74) *Attorney, Agent, or Firm* — Steve LeBlanc, LLC

(57) ABSTRACT

A trip cock valve for a brake system on a rail car includes a valve body that defines an inlet, a chamber downstream from the inlet, and an outlet downstream from the chamber. A piston is inside the chamber. A valve member operably connected to the piston has a first position that prevents fluid flow through the outlet and a second position that permits fluid flow through the outlet. A lever is operably engaged with the valve member to move the valve member from the first position to the second position. A valve position indicator downstream from the inlet is in fluid communication with the inlet when the valve member is in the second position.

17 Claims, 3 Drawing Sheets

TRIP COCK VALVE FOR A BRAKE SYSTEM ON A RAIL CAR

FIELD OF THE INVENTION

The present invention describes and enables a trip cock valve for a brake system on a rail car. In particular embodiments, the trip cock valve may be incorporated into the rail car to enable remote actuation of the brake system by a trip arm associated with a railway on which the rail car is travelling.

BACKGROUND OF THE INVENTION

Conventional trains typically rely on a pneumatic brake system to provide reliable braking. Although individual brake systems may vary slightly, they typically include a main reservoir located on a locomotive that supplies pressurized air through a brake pipe to each rail car connected in series to the locomotive. The brake pipe supplies the pressurized air to a combined auxiliary and emergency reservoir on each rail car. A control valve on each rail car senses pressure in the brake pipe to control actuation of the brake system and re-charging of the combined reservoir on each rail car.

For service braking, an operator slowly vents brake pipe pressure. For example, the operator may vent brake pipe pressure 6-8 pounds per square inch for minimum service reduction and 26 pounds per square inch for full service reduction. The control valve on each rail car senses the reduction in brake pipe pressure and repositions to supply a proportional air pressure from the auxiliary reservoir to a brake cylinder to actuate brake shoes on the rail car. To release the brakes, the operator charges air from the main reservoir to the brake pipe to increase brake pipe pressure. When the control valve on each rail car senses an increase in brake pipe pressure, the control valve repositions to vent air pressure from the brake cylinder to release the brake shoes. The control valve also repositions to allow brake pipe pressure to re-charge the auxiliary reservoir.

For emergency braking, the operator rapidly vents brake pipe pressure. When any control valve senses a sufficiently rapid reduction in brake pipe pressure, the control valve repositions to supply air pressure from the auxiliary and emergency reservoirs to the brake cylinder to actuate the brake shoes. In addition, the control valve repositions to vent brake pipe pressure locally to more rapidly propagate emergency braking to other rail cars in the train.

As an additional safety feature, the brake system often includes the ability to remotely actuate emergency braking to rapidly stop a train that exceeds an operating limit or travels along an unauthorized section of railway. For example, the brake system may include a trip cock valve mounted on the underside of each rail car and in fluid communication with the brake pipe. When remote actuation of emergency braking is desired, a trip arm located along the railway may be raised to contact and open the trip cock valve as the rail car passes over the trip arm. The opened trip cock valve rapidly vents brake pipe pressure to atmosphere, actuating emergency braking on the rail car and propagating the emergency braking to the other rail cars. Once brake pipe pressure is sufficiently reduced, the trip cock valve shuts to allow the brake system to be restored to normal operation.

While effective at providing remote actuation of emergency braking, trip cock valves occasionally initiate an undesired emergency (UDE) braking event that interrupts operations and creates additional hazards to personnel and equipment. Since the trip cock valves are biased to automatically reset to the shut position, it is difficult to identify the cause of the UDE and/or the particular trip cock valve that initiated the UDE. As a result, a defective trip cock valve may remain in service and cause additional UDEs which may create further delays and disruptions. Therefore, the need exists for an improved trip cock valve with a valve position indicator that can identify when the trip cock valve has been actuated and/or signal the actuation of the trip cock valve.

BRIEF DESCRIPTION OF THE INVENTION

Aspects and advantages of the invention are set forth below in the following description, or may be obvious from the description, or may be learned through practice of the invention.

One embodiment of the present invention is a trip cock valve for a brake system on a rail car. The trip cock valve includes a valve body that defines an inlet, a chamber downstream from the inlet, and an outlet downstream from the chamber. A piston is inside the chamber. A valve member operably connected to the piston has a first position that prevents fluid flow through the outlet and a second position that permits fluid flow through the outlet. A lever is operably engaged with the valve member to move the valve member from the first position to the second position. A valve position indicator downstream from the inlet is in fluid communication with the inlet when the valve member is in the second position.

An alternate embodiment of the present invention is a trip cock valve for a brake system on a rail car. The trip cock valve includes a valve body that defines an inlet, a chamber downstream from the inlet, and an outlet downstream from the chamber. A piston is inside the chamber. A valve member operably connected to the piston has a first position that prevents fluid flow through the outlet and a second position that permits fluid flow through the outlet. A lever is pivotally connected to the valve body to move the valve member from the first position to the second position. A valve position indicator is downstream from the chamber, and the piston prevents fluid communication between the inlet and the valve position indicator when the valve member is in the first position.

In yet another embodiment of the present invention, a trip cock valve for a brake system on a rail car includes a valve body that defines an inlet, a chamber downstream from the inlet, and an outlet downstream from the chamber. The trip cock valve further includes a means for attaching the valve body to the rail car and a piston inside the chamber. A valve member operably connected to the piston has a first position that prevents fluid flow through the outlet and a second position that permits fluid flow through the outlet. A valve position indicator downstream from the inlet is in fluid communication with the inlet when the valve member is in the second position, and the piston prevents fluid communication between the inlet and the valve position indicator when the valve member is in the first position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
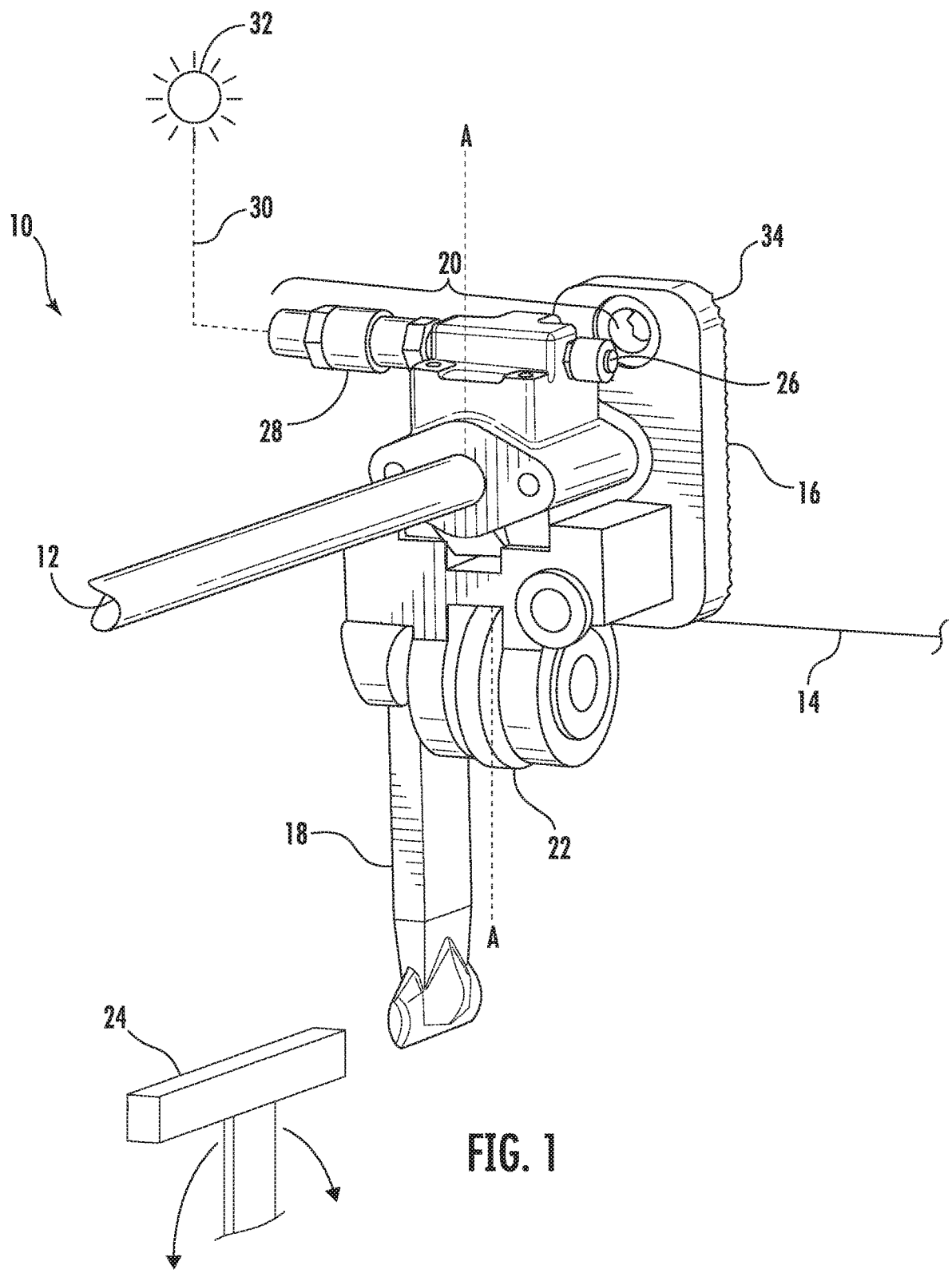
FIG. 1 is a perspective view of a trip cock valve according to one embodiment of the present invention installed in a brake system for a rail car.

Reference will now be made in detail to exemplary embodiments of the present disclosure, one or more examples of which are illustrated in the accompanying drawings. The detailed description uses numerical and letter designations to refer to features in the drawings. Like or similar designations in the drawings and description have been used to refer to like or similar parts of exemplary embodiments of the present disclosure. Each example is provided by way of explanation of the present disclosure, not limitation of the present disclosure. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide a trip cock valve for a brake system on a rail car. As used herein, references to a brake system and rail car in the preamble and body of the claims is for contextual purposes only and is not intended to be a limitation of any claim. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A.

FIG. 1 provides a perspective view of a trip cock valve 10 according to one embodiment of the present invention installed in a brake system 12 for a rail car 14. As shown in FIG. 1, the trip cock valve 10 generally includes a valve body 16, a lever 18, and a valve position indicator 20. The valve body 16 provides an outer casing that contains the internal parts of the trip cock valve 10. The lever 18 may pivotally connect to the valve body 16 and extend away from the valve body 16. As will be explained in more detail with respect to FIGS. 2 and 3, the lever 18 may operably connect to a cam 22 so that as the rail car 14 moves along the railway and the lever 18 comes into contact with a trip arm 24, the trip arm 24 may rotate the lever 18 and cam 22 to open the trip cock valve 10 and actuate the emergency braking system.

The valve position indicator 20 provides one or more indications that the trip cock valve 10 has been opened or actuated. As shown in FIG. 1, for example, the valve position indicator 20 may include a button 26 or other visual indicator that changes position to provide a visual indication that the trip cock valve 10 has been opened. Alternately or in addition, the valve position indicator 20 may include a pressure sensor 28 that senses pressure inside the trip cock valve 10 and/or brake system 12. The pressure sensor 28 may in turn generate a signal 30 when the trip cock valve 10 actuates to provide an alarm 32 or other remote indication that the particular trip cock valve 10 has been opened.

As shown in FIG. 1, the trip cock valve 10 may further include a means for attaching the valve body 16 to the rail car 14. In this manner, the trip cock valve 10 may be attached to an inconspicuous location on the rail car 14 that does not interfere with normal operations while still being proximate to a passing trip arm 24 on the railway. The structure for attaching the valve body 16 to the rail car 14 may be a bolt, screw, clamp, glue, band, weld, bracket or other equivalent structure known to one of ordinary skill in the art for attaching one component to another. For the particular embodiment shown in FIG. 1, the means for attaching the valve body 16 to the rail car 14 is a mounting bracket 34 attached to the rail car 14 using bolts or screws.

Figure 2:
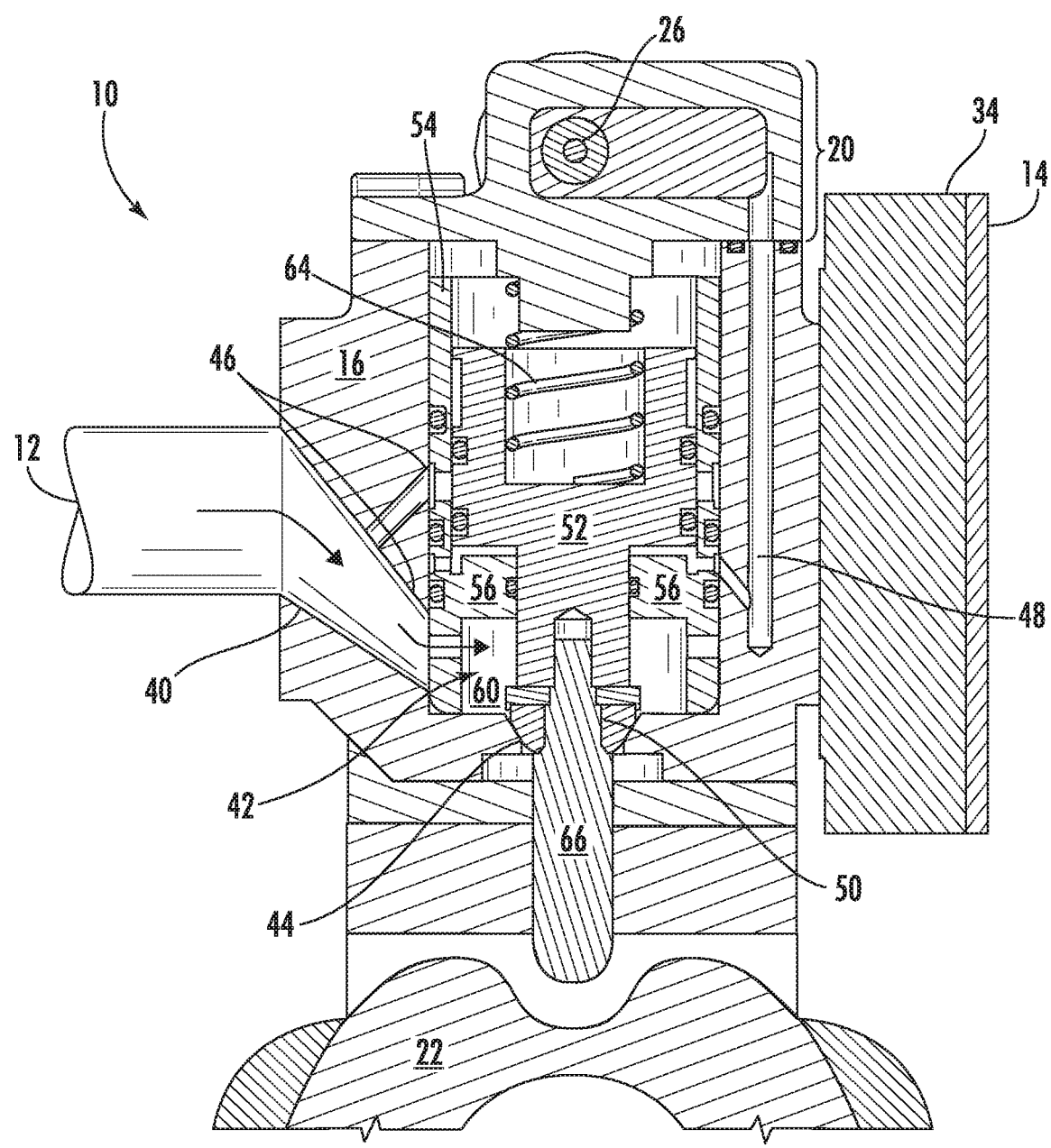
FIG. 2 is a side cross-section view of the trip cock valve shown in FIG. 1 taken along line A-A with the trip cock valve in the shut position.
Figure 3:
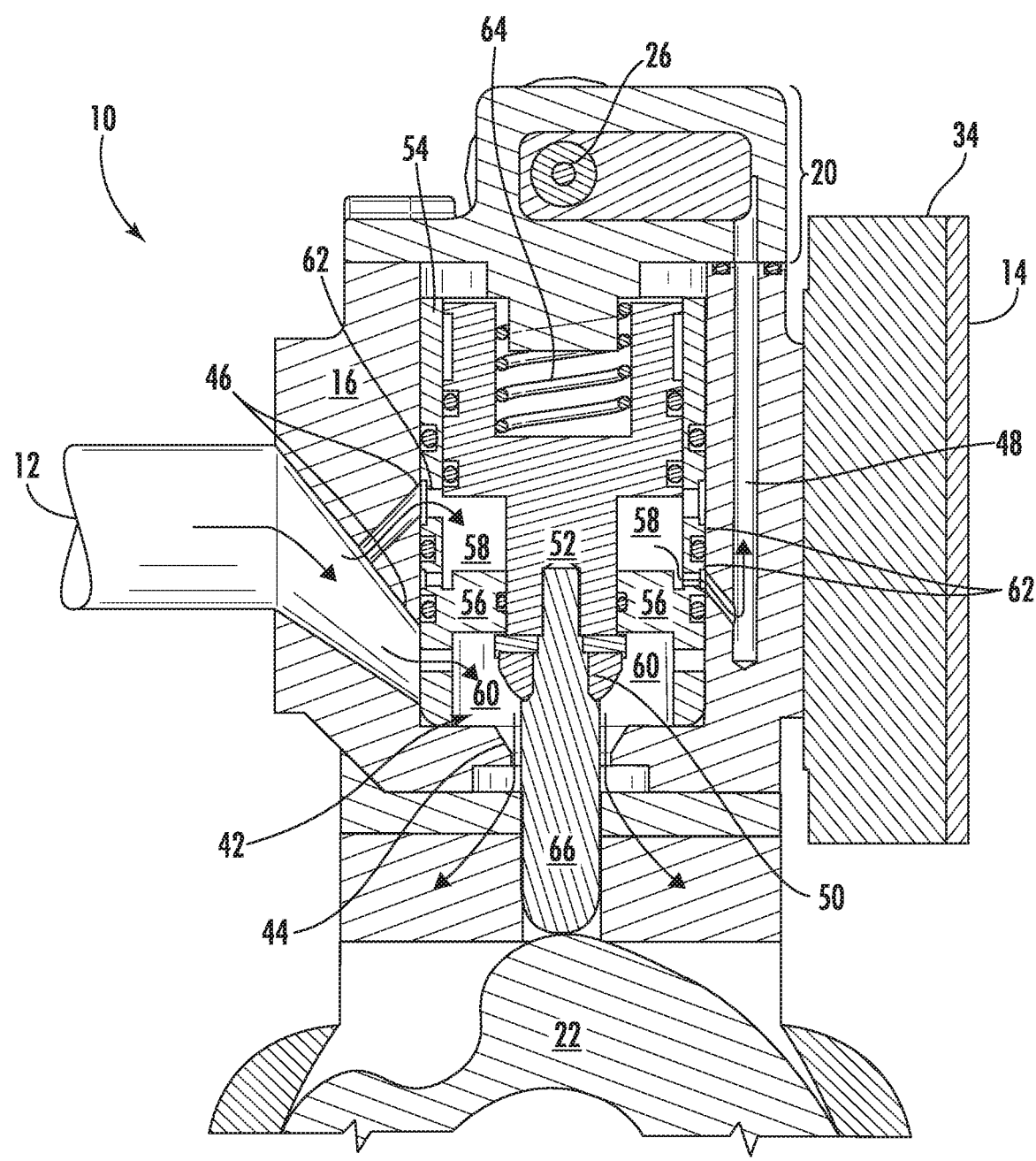
FIG. 3 is a side cross-section view of the trip cock valve shown in FIG. 1 taken along line A-A with the trip cock valve in the open position.

FIGS. 2 and 3 provide side cross-section views of the trip cock valve 10 shown in FIG. 1 taken along line A-A with the trip cock valve 10 in the shut and open positions, respectively. As shown in FIGS. 2 and 3, the valve body 16 defines an inlet 40, a chamber 42 downstream from the inlet 40, and an outlet 44 downstream from the chamber 42. The inlet 40 connects to the brake system 12 and provides fluid communication from the brake system 12 to the chamber 42. As shown in FIGS. 2 and 3, the valve body 16 may define multiple ports 46 that provide fluid communication from the inlet 40 into the chamber 42. The chamber 42 provides an internal volume between the inlet 40 and the outlet 44 for the internal components of the trip cock valve 10. The outlet 44 provides fluid communication from the chamber 42 to atmosphere.

As shown in FIGS. 2 and 3, the valve body 16 may also define a fluid passage 48 between the chamber 42 and the valve position indicator 20. The fluid passage 48 provides fluid communication between the chamber 42 and the valve position indicator 20 so the valve position indicator 20 can sense pressure in the chamber 42 reflective of the position or actuation of the trip cock valve 10.

For the particular embodiment shown in FIGS. 1-3, the trip cock valve 10 includes a valve member 50 operably connected to a piston 52 inside the chamber 42. A sleeve 54 surrounds at least a portion of the piston 52 and includes a diaphragm 56 that extends across the chamber 42 to separate the chamber 42 into an upper chamber 58 and a lower chamber 60. The sleeve 54 further includes a plurality of ports 62 that provide fluid communication from the inlet 40, through the upper chamber 58, to the fluid passage 48, depending on the position of the piston 52.

The valve member 50 moves in conjunction with the piston 52, and a spring 64 biases the valve member 50 and piston 52 to a first or shut position, as shown in FIG. 2. In the first or shut position, the brake system 12 is in fluid communication with the lower chamber 60 through the inlet 40 and inlet port 46, and the valve member 50 engages with the outlet 44 to prevent fluid flow from the lower chamber 60 through the outlet 44. In the first or shut position, the piston 52 prevents fluid communication between the inlet 40 and the upper chamber 58 or fluid passage 48. As a result, the piston 52 prevents fluid communication between the inlet 40 and the valve position indicator 20 when the valve member 50 is in the first or shut position.

The valve member 50 and piston 52 also have a second or open position, as shown in FIG. 3. In the second or open position, the brake system 12 is in fluid communication with the lower chamber 60 through the inlet 40 and inlet port 46, and the valve member 50 is separated from the outlet 44 to permit fluid flow from the lower chamber 60 through the outlet 44. In the second or open position, the piston 52 permits fluid communication between the inlet 40 and the upper chamber 58 and fluid passage 48. As a result, the piston 52 permits fluid communication between the inlet 40 and the valve position indicator 20 when the valve member 50 is in the second or open position.

Operation of the trip cock valve 10 will now be described with reference to FIGS. 1-3. As shown in FIG. 1, the trip cock valve 10 may be mounted to the underside of the rail car 14 so that the lever 18 extends away from the valve body 16 and into the path of the raised trip arm 24. In the first or shut position, the cam 22 is aligned with a piston follower 66 to allow the spring 64 to bias the valve member 50 and piston 52 downward, as shown in FIG. 2. In the first or shut position, the valve member 50 engages with the outlet 44 to prevent fluid flow from the lower chamber 60 through the outlet 44. In the first or shut position, the piston 52 prevents fluid communication between the inlet 40 and the upper chamber 58 or fluid passage 48. As a result, the piston 52 prevents fluid communication between the inlet 40 and the valve position indicator 20 when the valve member 50 is in the first or shut position.

When remote actuation of emergency braking is desired, the trip arm 24 located along the railway is raised to contact and rotate the lever 18 as the rail car 14 passes over the trip arm 24. Rotation of the lever 18 in turn causes rotation of the cam 22, as shown in FIG. 3. As the cam 22 rotates, it pushes the piston follower 66, valve member 50, and piston 52 upward to the second or open position. In the second or open position, the valve member 50 is separated from the outlet 44, allowing the brake system 12 to vent from the inlet 40, through the lower chamber 60, to atmosphere. At the same time, the piston 52 permits fluid communication between the inlet 40 and the upper chamber 58 and fluid passage 48, allowing fluid flow from the brake system 12 to the valve position indicator 20. The fluid flow from the brake system 12 to the valve position indicator 20 changes the position of the button 26 to provide a visual indication that the trip cock valve 10 has been opened. Alternately or in addition, the pressure sensor 28 may receive fluid flow from the brake system 12 to indicate pressure inside the trip cock valve 10 and/or brake system 12 and/or generate the signal 30 to provide the alarm 32 or other remote indication that the particular trip cock valve 10 has been opened.

After the trip cock valve 10 passes over the trip arm 24, the lever 18 and cam 22 return to the initial position shown in FIG. 2. When pressure from the brake system 12 has reduced sufficiently, the spring 64 again biases the valve member 50 and piston 52 downward to the first or shut position, as shown in FIG. 2. The local and remote indications provided by the valve position indicator 20 may continue to identify actuation of the trip cock valve 10 until manually or remotely reset, allowing identification of the trip cock valve 10 that initiated the emergency braking.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A trip cock valve for a brake system on a rail car, comprising:
    a valve body, wherein said valve body defines an inlet, a chamber downstream from said inlet, and an outlet downstream from said chamber;
    a piston inside said chamber;
    a sleeve around at least a portion of said piston, wherein said sleeve includes a diaphragm that extends across said chamber to separate said chamber into an upper chamber and a lower chamber;
    a valve member operably connected to said piston, wherein said valve member has a first position that prevents fluid flow through said outlet and a second position that permits fluid flow through said outlet;
    a lever operably engaged with said valve member to move said valve member from said first position to said second position; and
    a valve position indicator downstream from said inlet, wherein said valve position indicator is in fluid communication with said inlet when said valve member is in said second position.

2. The trip cock valve as in claim 1, wherein said valve body defines a fluid passage between said chamber and said valve position indicator.

3. The trip cock valve as in claim 1, wherein said piston prevents fluid communication between said inlet and said valve position indicator when said valve member is in said first position.

4. The trip cock valve as in claim 1, further comprising a cam operably engaged between said lever and said valve member to move said valve member from said first position to said second position.

5. The trip cock valve as in claim 1, wherein said valve position indicator comprises a pressure sensor.

6. The trip cock valve as in claim 1, wherein said valve position indicator generates a signal when said valve member moves from said first position to said second position.

7. The trip cock valve as in claim 1, further comprising a means for attaching said valve body to the rail car.

8. A trip cock valve for a brake system on a rail car, comprising:
    a valve body, wherein said valve body defines an inlet, a chamber downstream from said inlet, and an outlet downstream from said chamber;
    a piston inside said chamber;
    a diaphragm that extends across said chamber to separate said chamber into an upper chamber and a lower chamber;
    a valve member operably connected to said piston, wherein said valve member has a first position that prevents fluid flow through said outlet and a second position that permits fluid flow through said outlet;
    a lever pivotally connected to said valve body to move said valve member from said first position to said second position; and
    a valve position indicator downstream from said chamber, wherein said piston prevents fluid communication between said inlet and said valve position indicator when said valve member is in said first position.

9. The trip cock valve as in claim 8, wherein said valve body defines a fluid passage between said chamber and said valve position indicator.

10. The trip cock valve as in claim 8, further comprising a cam operably engaged between said lever and said valve member to move said valve member from said first position to said second position.

11. The trip cock valve as in claim 8, wherein said valve position indicator comprises a pressure sensor.

12. The trip cock valve as in claim 8, wherein said valve position indicator generates a signal when said valve member moves from said first position to said second position.

13. A trip cock valve for a brake system on a rail car, comprising:
- a valve body, wherein said valve body defines an inlet, a chamber downstream from said inlet, and an outlet downstream from said chamber;
- a means for attaching said valve body to the rail car;
- a piston inside said chamber;
- a sleeve around at least a portion of said piston, wherein said sleeve includes a diaphragm that extends across said chamber to separate said chamber into an upper chamber and a lower chamber;
- a valve member operably connected to said piston, wherein said valve member has a first position that prevents fluid flow through said outlet and a second position that permits fluid flow through said outlet;
- a valve position indicator downstream from said inlet, wherein said valve position indicator is in fluid communication with said inlet when said valve member is in said second position and said piston prevents fluid communication between said inlet and said valve position indicator when said valve member is in said first position.

14. The trip cock valve as in claim 13, wherein said valve body defines a fluid passage between said chamber and said valve position indicator.

15. The trip cock valve as in claim 13, further comprising a cam operably engaged with said valve member to move said valve member from said first position to said second position.

16. The trip cock valve as in claim 13, wherein said valve position indicator comprises a pressure sensor.

17. The trip cock valve as in claim 13, wherein said valve position indicator generates a signal when said valve member moves from said first position to said second position.

* * * * *